US009030711B2

(12) United States Patent
Yoshida et al.

(10) Patent No.: US 9,030,711 B2
(45) Date of Patent: May 12, 2015

(54) CONTROLLER, IMAGE FORMING APPARATUS, AND COMPUTER PROGRAM PRODUCT FOR RESTRICTING TOTAL TONER AMOUNT

(71) Applicants: Makoto Yoshida, Kanagawa (JP); Hiroaki Suzuki, Chiba (JP); Hiroo Kitagawa, Kanagawa (JP)

(72) Inventors: Makoto Yoshida, Kanagawa (JP); Hiroaki Suzuki, Chiba (JP); Hiroo Kitagawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 52 days.

(21) Appl. No.: 13/749,021

(22) Filed: Jan. 24, 2013

(65) Prior Publication Data
US 2013/0242350 A1  Sep. 19, 2013

(30) Foreign Application Priority Data

Mar. 13, 2012  (JP) .................................. 2012-055328

(51) Int. Cl.
*H04N 1/60* (2006.01)
(52) U.S. Cl.
CPC ............... *H04N 1/60* (2013.01); *H04N 1/6022* (2013.01)
(58) Field of Classification Search
None
See application file for complete search history.

(56) References Cited

U.S. PATENT DOCUMENTS

| | | | | |
|---|---|---|---|---|
| 7,940,425 B2 * | 5/2011 | Ohta et al. | | 358/2.1 |
| 8,456,681 B2 * | 6/2013 | Suzuki | | 358/1.15 |
| 8,531,724 B2 * | 9/2013 | Iinuma | | 358/1.9 |
| 2001/0035968 A1 * | 11/2001 | Higashikata et al. | | 358/1.9 |
| 2006/0188295 A1 | 8/2006 | Kasiske et al. | | |
| 2006/0232799 A1 * | 10/2006 | Nakatani et al. | | 358/1.9 |
| 2007/0085869 A1 * | 4/2007 | Hirano et al. | | 347/15 |
| 2009/0033956 A1 * | 2/2009 | Tamagawa | | 358/1.9 |
| 2009/0268216 A1 * | 10/2009 | Iinuma | | 358/1.4 |
| 2011/0235062 A1 * | 9/2011 | Suzuki | | 358/1.2 |
| 2012/0188561 A1 * | 7/2012 | Kuno | | 358/1.2 |
| 2012/0229819 A1 * | 9/2012 | Koyatsu et al. | | 358/1.1 |
| 2013/0070268 A1 * | 3/2013 | Yoshida et al. | | 358/1.9 |

FOREIGN PATENT DOCUMENTS

| | | |
|---|---|---|
| JP | 2002-305662 | 10/2002 |
| JP | 2005-311558 | 11/2005 |
| JP | 2007-155963 | 6/2007 |
| JP | 2008-532066 | 8/2008 |
| JP | 2009-058766 | 3/2009 |
| JP | 2010-194979 | 9/2010 |
| WO | WO2006/091366 A1 | 8/2006 |

* cited by examiner

*Primary Examiner* — Dung Tran
(74) *Attorney, Agent, or Firm* — Oblon, McClelland, Maier & Neustadt, L.L.P.

(57) ABSTRACT

According to an embodiment, provided is a controller that controls an image forming unit forming an image on a recording medium based on image data in which densities of a plurality of colors are specified for each pixel. The controller includes: a setting unit that sets a common representative value to a density of a specific color indicating one of the colors in each of a plurality of pixels included in a specific area indicating a specific area represented in the image data; and a determining unit that determines a density of each of the colors so that a sum of densities of the respective colors other than the specific color in the pixels included in the specific area becomes equal to or lower than a value acquired by subtracting the representative value from a reference value indicating a total amount restriction target of a total amount of toners.

10 Claims, 14 Drawing Sheets

FIG.8

| DENSITY RATIO | INPUT DENSITY | | TYPE OF SURFACE EFFECT | REPRE-SENTATIVE VALUE RV2 |
| --- | --- | --- | --- | --- |
| | MEDIAN | DENSITY RANGE | | |
| 98% | 250 | 248 | 255 | | |
| 96% | 245 | 243 | 247 | | |
| 94% | 240 | 238 | 242 | | |
| 92% | 235 | 233 | 237 | | |
| 90% | 230 | 228 | 232 | | |
| 88% | 224 | 222 | 227 | | |
| 86% | 219 | 217 | 221 | | |
| 84% | 214 | 212 | 216 | | |
| 82% | 209 | 207 | 211 | | |
| 80% | 204 | 202 | 206 | | |
| 78% | 199 | 197 | 201 | | |
| 30% | 76 | 74 | 79 | | |
| 28% | 71 | 69 | 73 | | |
| 26% | 66 | 64 | 68 | | |
| 24% | 61 | 59 | 63 | HAPTIC PATTERN TYPE 3 (COARSE) | V1 |
| 22% | 56 | 54 | 58 | HAPTIC PATTERN TYPE 2 (MEDIUM) | V2 |
| 20% | 51 | 49 | 53 | HAPTIC PATTERN TYPE 1 (FINE) | V3 |
| 18% | 46 | 44 | 48 | | |
| 16% | 41 | 39 | 43 | HALF-TONE MATTE TYPE 4 | V4 |
| 14% | 36 | 34 | 38 | HALF-TONE MATTE TYPE 3 | V5 |
| 12% | 31 | 29 | 33 | HALF-TONE MATTE TYPE 2 | V6 |
| 10% | 25 | 23 | 28 | HALF-TONE MATTE TYPE 1 | V7 |
| 8% | 20 | 18 | 22 | | |
| 6% | 15 | 13 | 17 | | |
| 4% | 10 | 8 | 12 | | |
| 2% | 5 | 1 | 7 | | |
| 0% | 0 | 0 | 0 | NONE | |

CONTROLLER, IMAGE FORMING APPARATUS, AND COMPUTER PROGRAM PRODUCT FOR RESTRICTING TOTAL TONER AMOUNT

CROSS-REFERENCE TO RELATED APPLICATIONS

The present application claims priority to and incorporates by reference the entire contents of Japanese Patent Application No. 2012-055328 filed in Japan on Mar. 13, 2012. The present application incorporates by reference the entire contents of Japanese Patent Application No. 2011-061598 filed in Japan on Mar. 18, 2011.

BACKGROUND OF THE INVENTION

1. Field of the Invention

The present invention relates to a controller, an image forming apparatus, and a computer program product.

2. Description of the Related Art

In image forming apparatuses such as printers and copy machines, conventionally known is that the image quality deteriorates when an excessive amount of a coloring material (recording material), e.g., toner or ink, is used. For example, when an excessive amount of toner is used in an electrophotographic image forming apparatus, fixing defects or transfer defects (color unevenness) might occur.

Such a challenge is known to be overcome by restringing the total amount of coloring materials used in drawing a single pixel to a level equal to or lower than a given total amount restriction target (total amount restriction). For example, Japanese Patent Application Laid-open No. 2005-311558 discloses a technology for determining a total amount restriction target based on the sum of the densities of respective colors in each pixel included in an area under such a restriction, printing conditions, the sum of densities of the respective colors in each pixel included in an area around such an area, and the like.

There are some cases that users wish to achieve a haptic effect on a surface of a sheet on which an image is formed. However, when the total amount restriction is applied, the thickness (height) of the sheet having attached with toner becomes almost even, and therefore it becomes difficult to achieve a haptic effect on a surface of a sheet.

There is a need to provide a controller, an image forming apparatus, and a computer program product that can realize a haptic effect while suppressing deterioration in the image quality.

SUMMARY OF THE INVENTION

It is an object of the present invention to at least partially solve the problems in the conventional technology.

According to an embodiment, provided is a controller that controls an image forming unit forming an image on a recording medium based on image data in which densities of a plurality of colors are specified for each pixel. The controller includes: a setting unit that sets a common representative value to a density of a specific color indicating one of the colors in each of a plurality of pixels included in a specific area indicating a specific area represented in the image data; and a determining unit that determines a density of each of the colors so that a sum of densities of the respective colors other than the specific color in the pixels included in the specific area becomes equal to or lower than a value acquired by subtracting the representative value from a reference value indicating a total amount restriction target of a total amount of toners.

According to another embodiment, provided is an image forming apparatus that includes: an image forming unit that forms an image on a recording medium based on image data in which densities of a plurality of colors are specified for each pixel; and a controller that controls the image forming unit. The controller includes: a setting unit that sets a common representative value to a density of a specific color indicating one of the colors in each of a plurality of pixels included in a specific area indicating a specific area represented in the image data; and a determining unit that determines a density of each of the colors so that a sum of densities of the respective colors other than the specific color in the pixels included in the specific area becomes equal to or lower than a value acquired by subtracting the representative value from a reference value indicating a total amount restriction target of a total amount of toners.

According to still another embodiment, provided is a computer program product that includes program codes. The program codes, when executed, causes a computer included in a controller that controls an image forming unit forming an image on a recording medium based on image data in which densities of a plurality of colors are specified for each pixel to execute: setting a common representative value to a density of a specific color indicating one of the colors in each of a plurality of pixels included in a specific area indicating a specific area represented in the image data; and determining a density of each of the colors so that a sum of densities of the respective colors other than the specific color in the pixels included in the specific area becomes equal to or lower than a value acquired by subtracting the representative value from a reference value indicating a total amount restriction target of a total amount of toners.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a schematic illustrating an example of a data structure in a first storage unit;

DETAILED DESCRIPTION OF THE PREFERRED EMBODIMENTS

Embodiments of a controller, an image forming apparatus, and a computer program product will now be explained in detail with reference to the accompanying drawings.

A: First Embodiment

Figure 1:
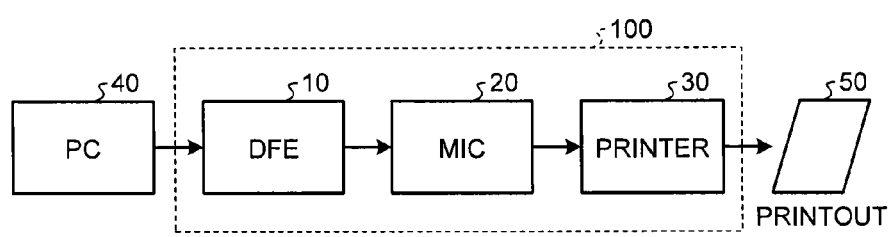
FIG. 1 is a block diagram illustrating an example of a general configuration of an image forming apparatus.

FIG. 1 is a block diagram illustrating an example of a general configuration of an image forming apparatus 100 according to a first embodiment. As illustrated in FIG. 1, the image forming apparatus 100 includes a controller (digital front end (DFE)) 10, an interface controller (mechanism interface controller (MIC)) 20, and a printer 30 that are connected to each other.

The DFE 10 communicates with the printer 30 via the MIC 20 to control image formation performed by the printer 30. A personal computer (PC) 40 is connected to the DFE 10. The PC 40 generates image information described in a language such as the page description language (PDL) using an application installed in advance, for example, and transmits the image information thus generated to the DFE 10. The DFE 10 converts the image information described in a language such as the PDL into image data in a format that is printable by the printer 30, and transmits the image data to the printer 30 via the MIC 20.

At least CMYK toners are installed in the printer 30. An imaging unit including a photosensitive element, a charging unit, a developing unit, and a photosensitive element cleaner, an exposing unit, and a fixing unit are also mounted correspondingly to each of the toners. The printer 30 forms a toner image in each of the colors (C, M, Y, and K) on the corresponding photosensitive element, by irradiating the photosensitive element with a light beam from the exposing unit based on the image data received from the DFE 10 via the MIC 20. The printer 30 then transfers the toner images in the respective colors formed on the respective photosensitive elements onto a recording medium such as paper in a manner overlapping each other. The recording medium is not limited to paper, but may be a synthetic paper or vinyl, for example. The toner image transferred on the recording medium is then fixed by heat and pressure applied by the fixing unit. In the manner described above, an image is formed on the recording medium, and a desired printout 50 is acquired. Because the structure of such printer 30 is known, a detailed explanation thereof is omitted herein.

A configuration of the DFE 10 will now be explained. As a hardware configuration, the DFE 10 includes a central processing unit (CPU) controlling the entire apparatus, a main storage unit such as a read-only memory (ROM) and a random access memory (RAM) storing therein various types of data and various computer programs, and an auxiliary storage unit such as a hard disk drive (HDD) storing therein various types of data and various computer programs. The DFE 10 has a hardware configuration utilizing a general computer.

Figure 2:
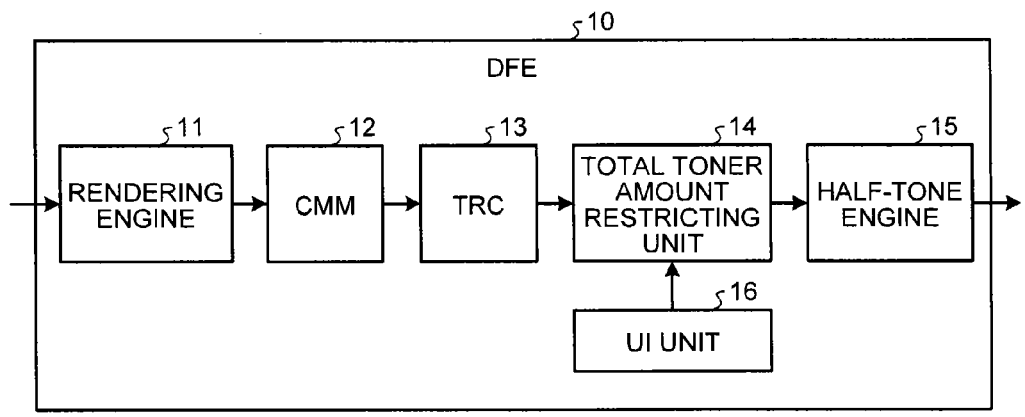
FIG. 2 is a block diagram illustrating an example of functions provided to a controller.

FIG. 2 is a block diagram illustrating an example of functions provided to the DFE 10. As illustrated in FIG. 2, functions provided to the DFE 10 include a rendering engine 11, a color management module (CMM) 12, a tone reproduction curve (TRC) 13, a total toner amount restricting unit 14, a half-tone engine 15, and a user interface (UI) unit 16 that displays various types of information and receives various instructions. These functions are realized by causing the CPU in the DFE 10 to execute various computer programs stored in the main storage unit and the auxiliary storage unit. These functions may be realized using independent circuits (hardware), without limitation to the computer programs.

The rendering engine 11 receives image information transmitted from the PC 40. The rendering engine 11 interprets the language of the received image information, generates image data represented in an RGB color space, for example, and supplies the image data thus generated to the CMM 12. The CMM 12 converts the image data represented in an RGB color space into image data represented in a CMYK color space, for example, and outputs the image data to the TRC 13.

The TRC 13 calibrates the image data of the CMYK plates received from the CMM 12. The TRC 13 then performs a gamma correction using a gamma curve of a one-dimensional lookup table (1D_LUT) generated by the calibration, and outputs the gamma-corrected image data to the total toner amount restricting unit 14. The image data is represented in units of a page, and each pixel in the image data in the CMYK plates is represented by eight-bit ("0" to "255") density.

The total toner amount restricting unit 14 restricts the total amount of toners used in the image data of the CMYK plates received from the TRC 13, and outputs the image data of the CMYK plates having the total toner amount restricted to the half-tone engine 15. The half-tone engine 15 performs a half-tone process for converting the image data of the CMYK plates supplied from the total toner amount restricting unit 14 into image data in a format in which each of the CMYK colors is represented by two bits (the pixel depth of two bits is an example without any limitation) and that is to be output to the printer 30. The half-tone engine 15 then outputs the image data having applied with the half-tone process and in which each of CMYK is represented by two bits to the printer 30 via the MIC 20. The number of bits used in representing the density of each of the pixels included in the image data may be any number, without limitation to two bits.

Figure 3:
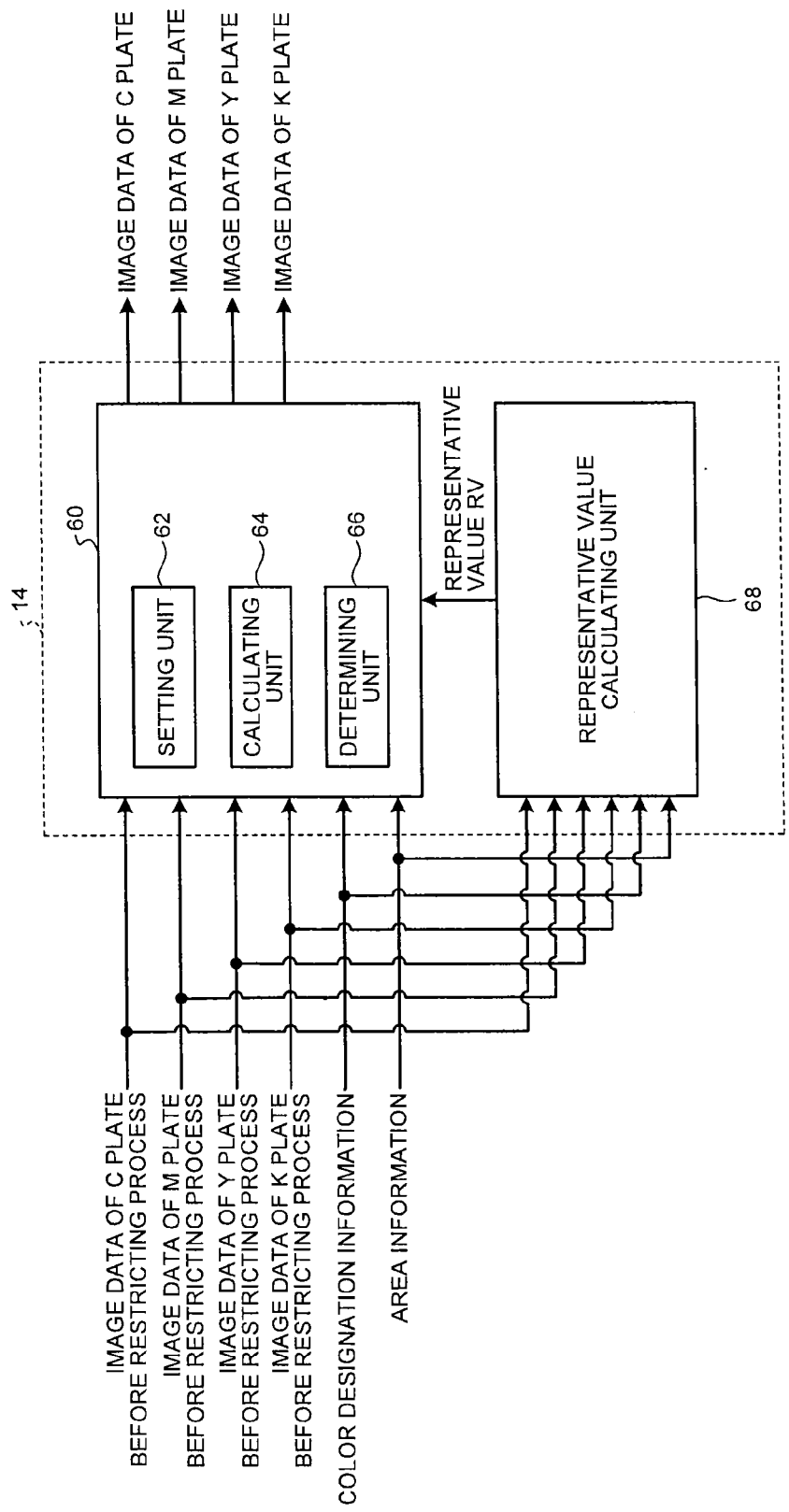
FIG. 3 is a block diagram illustrating an example of a functional configuration of a total toner amount restricting unit according to a first embodiment.
Figure 4:
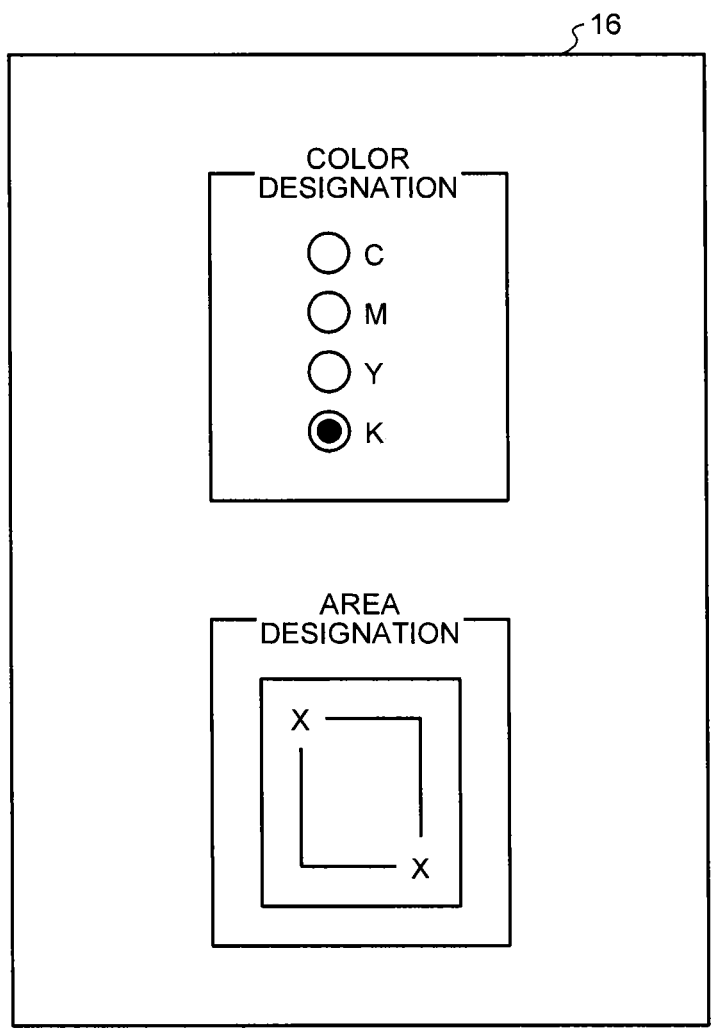
FIG. 4 is a schematic illustrating an example of an input screen.

FIG. 3 is a block diagram illustrating an example of a functional configuration of the total toner amount restricting unit 14. As illustrated in FIG. 3, the total toner amount restricting unit 14 includes a restricting unit 60 and a representative value calculating unit 68. Both of the restricting unit 60 and the representative value calculating unit 68 receive the image data of the CMYK plates, color designation information for designating any one of the colors of CMYK, and area information for designating a given area in the image data. In the first embodiment, a screen for prompting a user to designate a color and an area is displayed on the UI unit 16, as illustrated in FIG. 4. For example, when a user selects a button (for example, a button displayed on the UI unit 16) corresponding to each of the colors of C, M, Y, and K, the UI unit 16 is caused to output color designation information indicating the color designated by the user to the total toner amount restricting unit 14. When a user selects two coordinates, for example, in the image data displayed on the UI unit 16, a rectangular area having corners at the two coordinates is designated, and the UI unit 16 is caused to output area information indicating the area designated by the user to the total toner amount restricting unit 14. Such a screen is merely an example, and the color designation information and the area information may be entered in any way. Furthermore, explained herein is an example in which the UI unit 16 is provided to the DFE 10, but the UI unit 16 may be provided to the PC 40, for example. In other words, the DFE 10 may receive the color designation information and the area information from the PC 40.

The restricting unit 60 performs a restricting process in which the total amount of toners in each pixel included in image data is restricted to a level equal to or lower than a total amount restriction target. In the example explained herein, a reference value representing the total amount restriction target is set in advance as an upper boundary of the sum of the densities of CMYK in a single pixel. As illustrated in FIG. 3, the restricting unit 60 includes a setting unit 62, a calculating unit 64, and a determining unit 66. The setting unit 62 sets a common (the same) representative value RV to the density of a specific color in each of a plurality of pixels included in a specific area in the image data of a color plate before the restricting process is applied. In the first embodiment, the color designated in the color designation information is used as the "specific color", and the area designated in the area information is used as the "specific area". For each of the pixels in the specific area, the calculating unit 64 calculates the sum of the densities of the respective colors in the pixel, using the representative value RV. The determining unit 66 determines the density of each of the colors in each of the pixels in the specific area, using the sum of the densities of the respective colors in the pixel, the representative value RV, and the reference value.

Figure 5:
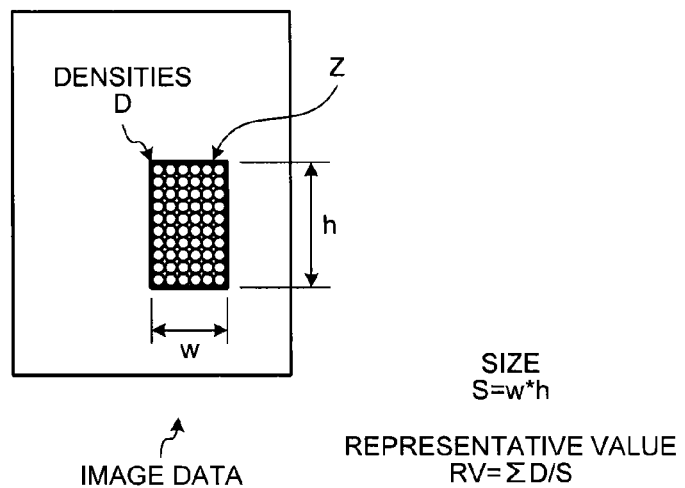
FIG. 5 is a schematic of an example of a specific area.

Every time image data of a color plate specified by the color designation information (specific color plate) is acquired in units of a page, the representative value calculating unit 68 calculates a representative value RV based on the density in each of the pixels in the specific area represented in the image data of a specific color plate before set to the representative value RV. For example, it is assumed herein that the area Z illustrated in FIG. 5 is designated by the area information, and K (black), among the colors of CMYK, is designated by the color designation information. As illustrated in FIG. 5, the area Z is a rectangular area having a width w in a lateral direction and a width h in a horizontal direction. In such an example, the representative value calculating unit 68 acquires the representative value RV by dividing the sum ED of the densities in the respective pixels included in the area Z in the image data of the K plate by the size S of the area Z (=w×h), and outputs the representative value RV thus acquired to the restricting unit 60. The representative value RV may be calculated in any way, without limitation to the way described above. For example, a dispersion of the densities in the respective pixels in the specific area represented in the image data of a specific color plate may be used as a representative value RV. In summary, the representative value RV is calculated based on the densities in the respective pixels in the specific area represented in the image data of a specific color plate.

Figure 6:
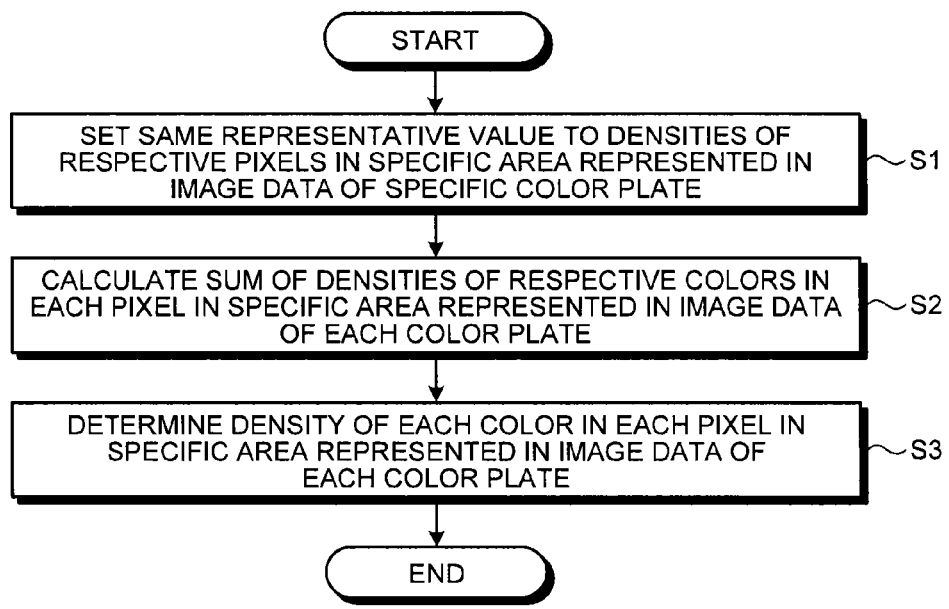
FIG. 6 is a flowchart illustrating an example of a restricting process.

The restricting process performed by the restricting unit 60 will now be explained. FIG. 6 is a flowchart illustrating an example of the restricting process according to the first embodiment. It is assumed herein that the restricting unit 60 has already received the image data of the CMYK plates before applied with the restricting process, the color designation information, and the area information, and the representative value RV from the representative value calculating unit 68. As illustrated in FIG. 6, to begin with, the setting unit 62 sets the same representative value RV to the density of each of the pixels in the specific area represented in the image data of the specific color plate before applied with the restricting process, regardless of the density of the pixel (Step S1). For example, the setting unit 62 sets the same representative value RV to the density of each of the pixels included in the area Z represented in the image data of the K plate. The calculating unit 64 then calculates the sum of the densities of the respective colors in each of the pixels in the specific area represented in the image data of the respective color plates (S2). For example, the calculating unit 64 calculates the sum of the densities of colors C, M, Y, and K in each of the pixels in the area Z that is represented in the image data of the CMYK plates.

For each of the pixels in the specific area represented in the image data of each of the color plates, the determining unit 66 determines the density of each of the colors in the pixel using the sum of the densities of the respective colors in the pixel, the representative value RV, and a reference value (Step S3). More specifically, for each of the pixels in the specific area represented in the image data of each of the color plates, the determining unit 66 determines the density of each of the colors so that the sum of the densities of the respective colors other than the specific color in the pixels becomes equal to or lower than a value acquired by subtracting the representative value RV from the reference value. If the density of the specific color in the pixel before set to the representative value RV is "zero", the density of the specific color in the pixel is set to zero. If the density of the specific color in the pixel before set to the representative value RV is higher than zero, the determining unit 66 determines the representative value RV as the density of the specific color in the pixel. This process will now be explained focusing on one pixel included in the area Z. It is assumed herein that the density of the color C in the pixel before applied with the restricting process is $\alpha 1$, the density of the color M is $\beta 1$, and the density of the color Y is $\gamma 1$. Therefore, the sum of the densities of the colors CMYK in the pixel calculated at Step S3 is $\alpha 1+\beta 1+\gamma 1+RV$.

To begin with, the determining unit 66 determines if the sum of the densities of the colors CMYK in the pixel calculated at Step S3 exceeds the reference value. If the sum of the densities in the pixel is equal to or less than the reference value, the determining unit 66 determines the densities of the colors other than K before applied with the restricting process as the densities of these colors. In other words, $\alpha 1$ is determined to be the density of the color C, $\beta 1$ is determined to be the density of the color M, and $\gamma 1$ is determined to be the density of the color Y. If the density of the color K in the pixel before set to the representative value RV is "zero", the determining unit 66 determines zero as the density of the color K in the pixel. If the density of the color K in the pixel before set to the representative value RV is higher than zero, the determining unit 66 determines the representative value RV as the density of the color K in the pixel.

If the sum of the densities of the colors CMYK in the pixel calculated at Step S3 exceeds the reference value, the determining unit 66 determines the densities of the colors CMY so that the sum of the densities of the colors CMY in the pixels becomes equal to or lower than a value acquired by subtracting the representative value RV from the reference value. More specifically, the density of the color C in the pixel is determined by Equation (1) below:

$$\alpha 2=\alpha 1\times(\text{Limit}-RV)/(\alpha 1+\beta 1+\gamma 1) \qquad (1)$$

In Equation (1), α2 is the density of the color C determined by the determining unit 66, and Limit represents the reference value.

The density of the color M in the pixel is determined by Equation (2) below:

$$\beta 2=\beta 1\times(\text{Limit}-RV)/(\alpha 1+\beta 1+\gamma 1) \qquad (2)$$

In Equation (2), β2 is the density of the color M determined by the determining unit 66.

The density of the color Y in the pixel is determined by Equation (3) below:

$$\gamma 2=\gamma 1\times(\text{Limit}-RV)/(\alpha 1+\beta 1+\gamma 1) \qquad (3)$$

In Equation (3), γ2 is the density of the color Y determined by the determining unit 66.

When the density of the color K in the pixel before set to the representative value RV is "zero", the determining unit 66 determines zero as the density of the color K in the pixel. By contrast, when the density of the color K in the pixel before set to the representative value RV is higher than zero, the determining unit 66 determines the representative value RV as the density of the color K in the pixel.

In the manner described above, the determining unit 66 determines the densities of the colors CMYK in each of the pixels included in the area Z so that the sum of the densities of the colors CMYK in the pixels becomes equal to or lower than the reference value. In this manner, CMYK plate image data in which the total amount of toners is restricted is generated.

As explained above, in the first embodiment, the density of each of the colors is determined so that the sum of the densities of the respective colors other than the specific color in each of the pixels in the specific area represented in the image data becomes equal to or lower than the value acquired by subtracting the representative value RV from the reference value. When the density of the specific color in the pixel before set to the representative value RV is zero, zero is determined as the density of the specific color in the pixel. When the density of the specific color in the pixel before set to the representative value RV is higher than zero, the representative value RV is determined as the density of the specific color in the pixel. Therefore, a haptic effect of the specific color can be realized on a recording medium, while suppressing degradations in the image quality, advantageously.

Furthermore, because an average of the densities of a specific color in the respective pixels in the specific area is used as the representative value RV, even when the total amount of toners is regulated in a pixel where the density of the specific color is high, a sufficient range of densities can be ensured for the colors other than the specific color. In other words, because the densities of the colors other than the specific color in the pixel can be prevented from becoming extremely low, the image quality can be improved.

B: Second Embodiment

A second embodiment will now be explained. The second embodiment is different from the first embodiment in that image data of a special color plate, as well as the image data of the CMYK plates, is input to the total toner amount restricting unit 14. In the explanation below, parts that are different from the first embodiment will be mainly explained. The parts that are the same as those in the first embodiment are assigned with the same reference numerals, and explanations thereof are omitted as appropriate.

A special color plate is image data for allowing special toner or ink such as white, gold, and silver color other than basic colors such as CMYK or RGB on which to be attached; and is data for a printer in which such special toner or ink is installed. Sometimes a special color plate is used to add red color to the basic CMYK colors, or to add yellow color to the basic RGB colors to improve color reproducibility. A colorless clear toner is usually handled as a special color. In the second embodiment, image data of a special color plate is used as a gloss controlling plate for controlling clear toner to be attached in a manner corresponding to a surface effect. The surface effect herein realizes a haptic effect on a surface of a recording medium on which an image is formed, and examples of the surface effect includes texture and matte.

Each pixel in the gloss controlling plate is represented by an eight-bit density ranging from "0" to "255" in the same manner as in an RGB plate or a CMYK plate (alternatively, the density may be expressed by 0 percent to 100 percent), and a type of the surface effect is associated with the density. The densities in an area to be provided with the same surface effect are set to the same value regardless of the density of the clear toner to be actually attached. Therefore, such an area can be easily identified from the image data as required, even without any data indicating such an area. In other words, a gloss controlling plate indicates a type of a surface effect, and an area to which the surface effect is provided (data indicating the area may be provided separately). Each pixel in the gloss controlling plate corresponds to each pixel in the image data of the color plates, and the gloss controlling plate is provided in units of a page.

An image process application allows a user to specify which area in the gloss controlling plate (in other words, which area in a recording medium) is to be applied with the surface effect. In the PC 40 running the image process application, a gloss controlling plate is generated by setting a density representing a gloss controlling value that corresponds to a surface effect specified by a user to each of the pixel included in the area specified by the user. A relation between a density and a surface effect type will be described later. In the second embodiment, the "specific area" is the area to which a surface effect is provided, and the "specific color" is the clear toner.

Figure 7:
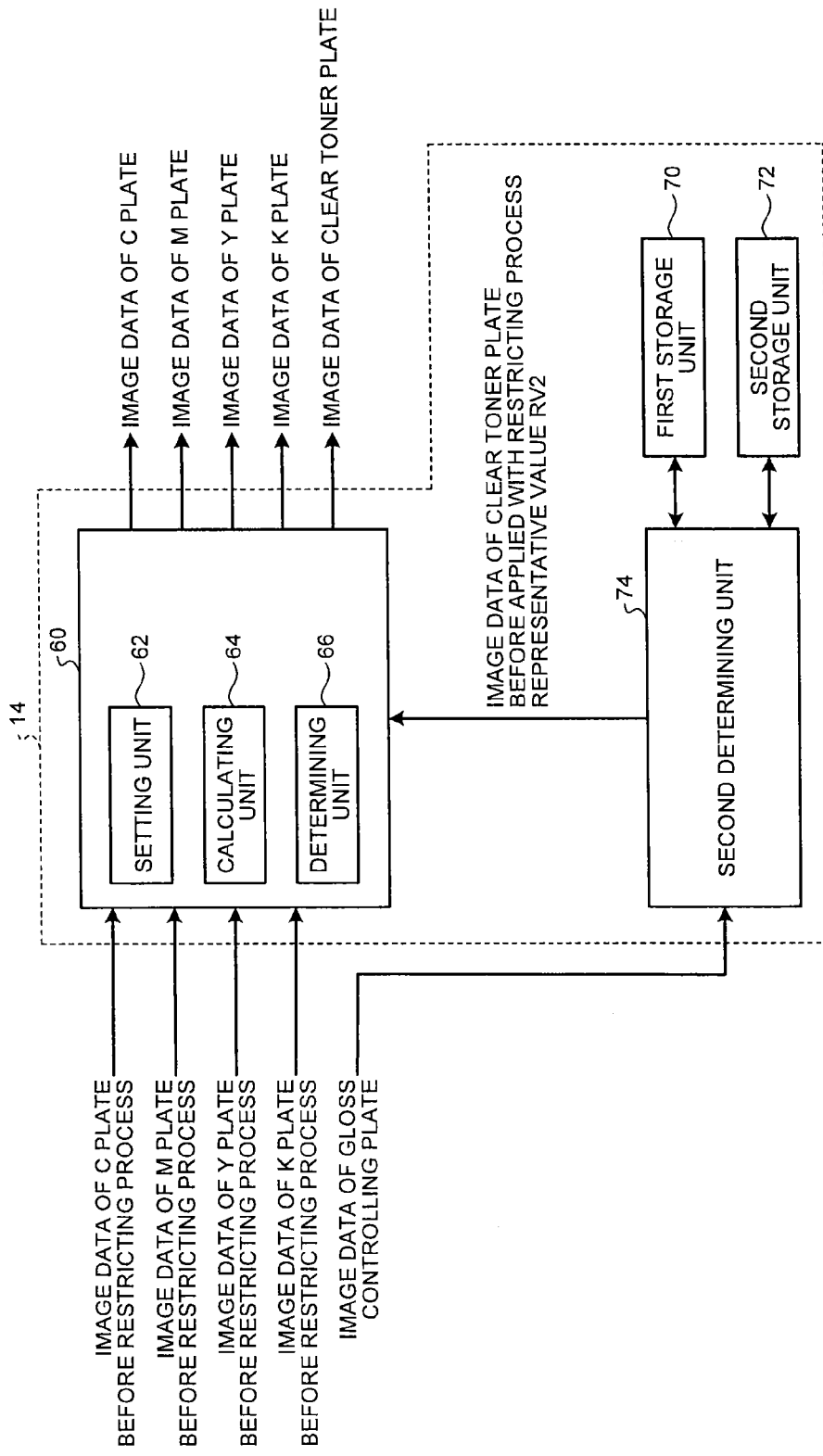
FIG. 7 is a block diagram illustrating an example of a functional configuration of a total toner amount restricting unit according to a second embodiment.

FIG. 7 is a block diagram illustrating an example of a detailed functional configuration of the total toner amount restricting unit 14 according to the second embodiment. As illustrated in FIG. 7, the total toner amount restricting unit 14 includes the restricting unit 60, a first storage unit 70, a second storage unit 72, and a second determining unit 74. The restricting unit 60 is different from that according to the first embodiment in that the restricting unit 60 according to the second embodiment does receive CMYK plate image data, but does not the color designation information and the area information. The other functions of the restricting unit 60 are the same as those according to the first embodiment.

The first storage unit 70 stores therein an input density indicating the density of a pixel included in a gloss controlling plate and a type of a surface effect in an associated manner. FIG. 8 is a schematic illustrating an example of a data structure in the first storage unit 70 according to the second embodiment. An input density, a surface effect type, and a representative value RV2 to be described later are associated with one another in FIG. 8. In the relation between an input density and a surface effect type illustrated in FIG. 8, each of the surface effect types is associated with a range of input densities. A surface effect type is associated with each 2 percent of a density ratio (percentage) that is converted from a representative value in a range of densities.

In the example illustrated in FIG. 8, a surface effect type corresponding to a range of input densities ("59" to "63")

from which a density ratio of 24 percent is acquired is set to a "haptic pattern type 3 (coarse)", and the representative value RV2 is set to "V1". A surface effect type corresponding to a range of input densities ("54" to "58") from which a density ratio of 22 percent is acquired is set to a "haptic pattern type 2 (medium)", and the representative value RV2 is set to "V2". A surface effect type corresponding to a range of input densities ("49" to "53") from which a density ratio of 20 percent is acquired is set to a "haptic pattern type 1 (fine)", and the representative value RV2 is set to "V3". A surface effect type corresponding to a range of input densities ("39" to "43") from which a density ratio of 16 percent is acquired is set to "half-tone matte type 4", and the representative value RV2 is set to "V4". A surface effect type corresponding to a range of input densities ("34" to "38") from which a density ratio of 14 percent is acquired is set to a "half-tone matte type 3", and the representative value RV2 is set to "V5". A surface effect type corresponding to a range of input densities ("29" to "33") from which a density ratio of 12 percent is acquired is set to "half-tone matte type 2", and the representative value RV2 is set to "V6". A surface effect type corresponding to a range of input densities ("23" to "28") from which a density ratio of 10 percent is acquired is set to a "half-tone matte type 1", and the representative value RV2 is set to "V7". No surface effect is associated with the density "zero".

Figure 9:
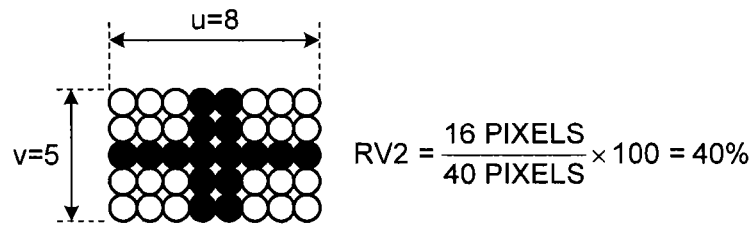
FIG. 9 is a schematic of an example of a pattern image.

Referring back to FIG. 7, the functional configuration of the total toner amount restricting unit 14 is further explained. The second storage unit 72 stores therein a surface effect type and a type of a pattern image including a plurality of pixels arranged in a matrix and each of which is pre-assigned with a density, in an associated manner. FIG. 9 is a schematic of an example of a pattern image corresponding to the haptic pattern type 3 (coarse). In this example, the pattern image includes a plurality of pixels arranged in a matrix having eight columns and five rows. In other words, the width u of the pattern image corresponds to eight pixels, and the height v corresponds to five pixels. The density of each of the pixels included in the pattern image is set to either "0" or "255". In the example illustrated in FIG. 8, a pixel illustrated by a white circle represents a pixel having a density set to "zero", and a pixel illustrated by a black circle represents a pixel having a density set to "255".

The representative value RV2 corresponding to an input density is set in advance, based on the density of each of the pixels included in the pattern image corresponding to the input density. In the example illustrated in FIG. 9, the representative value RV2 is set to a value acquired by dividing the sum of the densities of the respective pixels in the pattern image by the size of the pattern image. In the example illustrated in FIG. 8, because the number of pixels having densities set to "255" is 16 pixels in the pattern image, and the total number of pixels in the pattern image is 40 pixels, RV2=16/40×100=40 percent. The representative value RV2 may be calculated in any way, without limitation to the way described above. For example, a dispersion of the densities of the respective pixels included in the pattern image may be used as a representative value RV2. In summary, the representative value RV2 is calculated based on the density of each of the pixel included in a pattern image. In the example explained herein, as illustrated in FIG. 8, the representative value RV2 of the pattern image corresponding to the haptic pattern type 3 (coarse), that is, the representative value RV2 of the pattern image corresponding to the input density range resulting in a density ratio of 24 percent is set to "V1".

Referring back to FIG. 7, the functional configuration of the total toner amount restricting unit 14 is further explained. The second determining unit 74 receives a gloss controlling plate. Every time a single page of a gloss controlling plate is received, the second determining unit 74 determines the density in each of the pixels in the specific area (the area to which the surface effect is provided) before set to the representative value RV2 from the input density of the specific area in the gloss controlling plate. In this manner, image data representing a two-bit clear toner plate for attaching clear toner before the restricting process is performed is generated. The second determining unit 74 outputs the image data of the clear toner plate before applied with the restricting process and the representative value RV2 of the specific area, to the restricting unit 60. Each of the pixels included in the image data of the clear toner plate corresponds to each of the pixels in the gloss controlling plate, and the clear toner plate is provided in units of a page.

In the second embodiment, the second determining unit 74 determines the densities of the pixels in the specific area of the clear toner plate before set to the representative value RV2, using a pattern image corresponding to the input density. More specifically, the densities are determined in the manner described below.

The second determining unit 74 first reads a surface effect type corresponding to input density in the received gloss controlling plate from the first storage unit 70. The second determining unit 74 then reads a pattern image corresponding to the surface effect type thus read from the second storage unit 72. The second determining unit 74 then divides the gloss controlling plate using a virtual block in a size of the pattern image read from the second storage unit 72. The second determining unit 74 then acquires the density of each of the pixels in the specific area assuming that the pattern image is assigned to each segment thus divided, and determines the densities of the pixels in the specific area in the clear toner plate.

Figure 10:
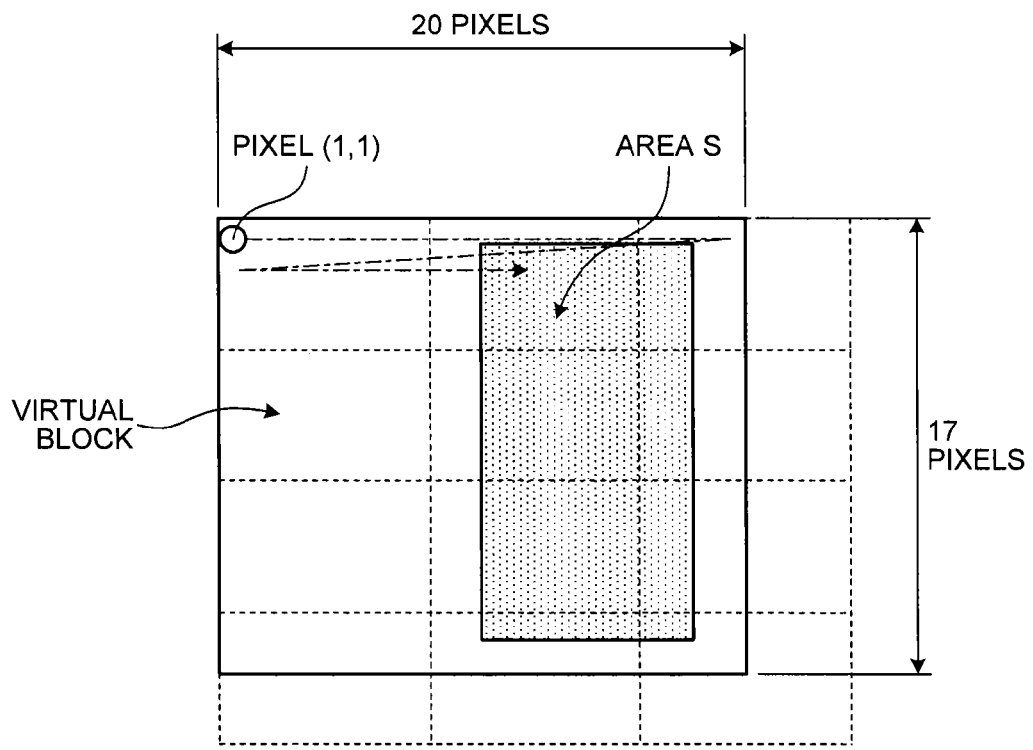
FIG. 10 is a schematic for explaining a tiling process.

As an example, it is assumed herein that the second determining unit 74 receives the gloss controlling plate illustrated in FIG. 10. In the example illustrated in FIG. 10, an area S is specified by a user as an area to which the haptic pattern type 3 (coarse) is applied, and the area other than the area S is not provided with the surface effect. It is also assumed that the input density of each of the pixels included in the area S is "60" (in other words, a density ratio of 24 percent).

The second determining unit 74 can identify the area S to which the surface effect is applied in the gloss controlling plate by reading the surface effect type corresponding to the input density of the each of the pixels included in the gloss controlling plate from the first storage unit 70. In such a case, because the input density of each of the pixels included in the area S is "60", the second determining unit 74 can identify the surface effect type corresponding to the input density as the haptic pattern type 3 (coarse), and identify the representative value RV2 corresponding to the surface effect type as "V1" (see FIG. 8). The second determining unit 74 then reads the pattern image (in this example, pattern image illustrated in FIG. 9) corresponding to the haptic pattern type 3 (coarse) from the second storage unit 72, and divides the gloss controlling plate using a virtual block in a size of the pattern image thus read. In the example illustrated in FIG. 10, the gloss controlling plate includes a plurality of pixels arranged in a matrix having 20 columns and 17 rows. In other words, the width w of the gloss controlling plate in the horizontal direction is 20 pixels and the width h in the vertical direction is 17 pixels. In the example illustrated in FIG. 10, as a result of dividing the gloss controlling plate, the gloss controlling plate has 2.5 (=20/8) virtual blocks in the row direction (horizontal direction) and 3.4 (=17/5) virtual blocks in the column direction (vertical direction). Hereinafter, a pixel positioned at the xth row (1≤x≤20) in the yth column (1≤y≤17) is expressed as a pixel (x, y).

The second determining unit 74 then performs a process of acquiring the densities of the pixels in the specific area assuming that the pattern image is assigned to each of the segments divided from the clear toner plate (referred to as a "tiling process"). In this manner, the image data of the clear toner plate before applied with the restricting process is generated. The tiling process is performed to each of the pixels sequentially, from the pixel (1, 1) positioned on the upper left in FIG. 10 in an order indicated by an arrow in a long dashed and short dashed line. The tiling process applied to the pixels will now be explained using a pixel (12, 12) included in the area S as an example. For the pixels included in the area other than the area S, the second determining unit 74 determines the density "zero" in the gloss controlling plate as the density in the clear toner plate, as it is.

Figure 11:
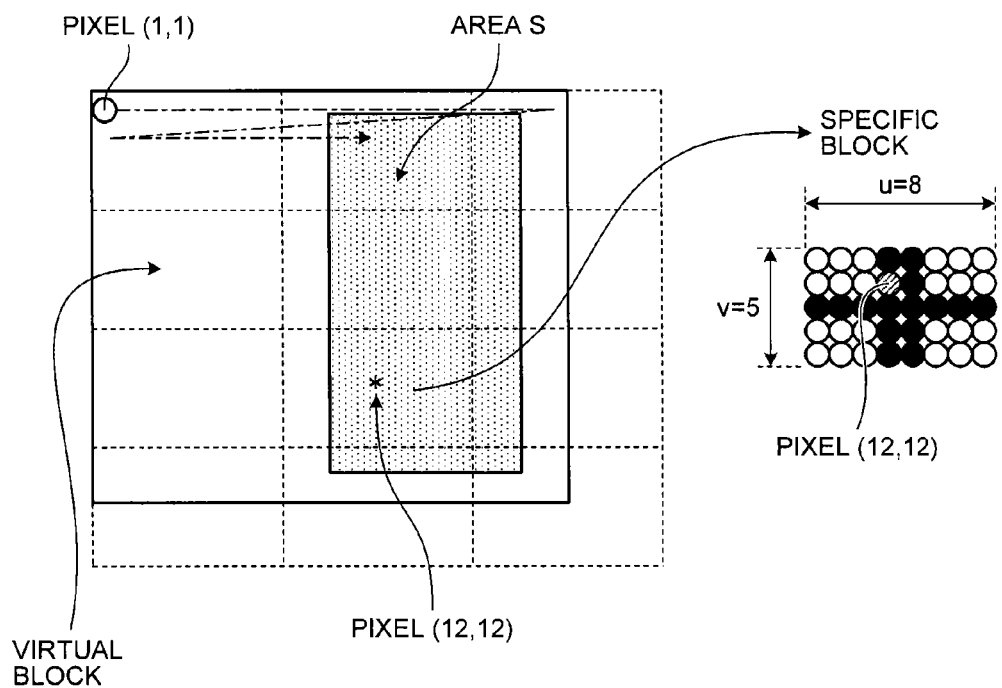
FIG. 11 is another schematic for explaining the tiling process.

To begin with, the second determining unit 74 identifies the position of the pixel (12, 12) in the virtual block (referred to as a "specific block", for convenience) to which the pixel belongs. Because the pixel (12, 12) is positioned at the twelfth row in the row direction, and the number of rows included in a single virtual block (height v) is five (see FIG. 9), the second determining unit 74 identifies "two", which is the remainder of 12/5, as the position of the pixel in the specific block along the row direction. Similarly, because the pixel (12, 12) is positioned at the twelfth column, and the number of columns included in a single virtual block (width u) is eight (see FIG. 9), the second determining unit 74 identifies "four", which is the remainder of 12/8, as the position of the pixel in the specific block along the column direction. Therefore, in this example, the second determining unit 74 identifies that the pixel (12, 12) is located in the second row and the fourth column in the specific block, as illustrated in FIG. 11. As may be understood from FIG. 9, because, among the pixels making up the pattern image, the pixel positioned at the second row and the fourth column has a density of "255", the second determining unit 74 determines the density of the pixel (12, 12) as "255".

Figure 12:
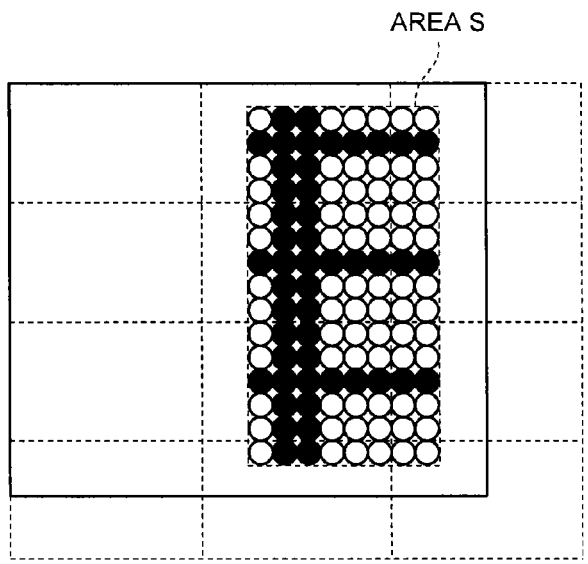
FIG. 12 is a schematic of an example of image data of a clear toner plate before applied with the restricting process, acquired by repeating the tiling process.

FIG. 12 is a schematic illustrating the densities of the pixels included in the area S, acquired by repeating the tiling process. A pixel illustrated by a white circle represents a pixel having a density set to "zero", and a pixel illustrated by a black circle represents a pixel having a density set to "255". In this manner, the second determining unit 74 converts the gloss controlling plate into image data representing a clear toner plate before applied with the restricting process. The second determining unit 74 then outputs the image data of the clear toner plate before applied with the restricting process and the representative value RV2 (V1 in this example) corresponding to the specific area (the area S in this example) to the restricting unit 60.

Figure 13:
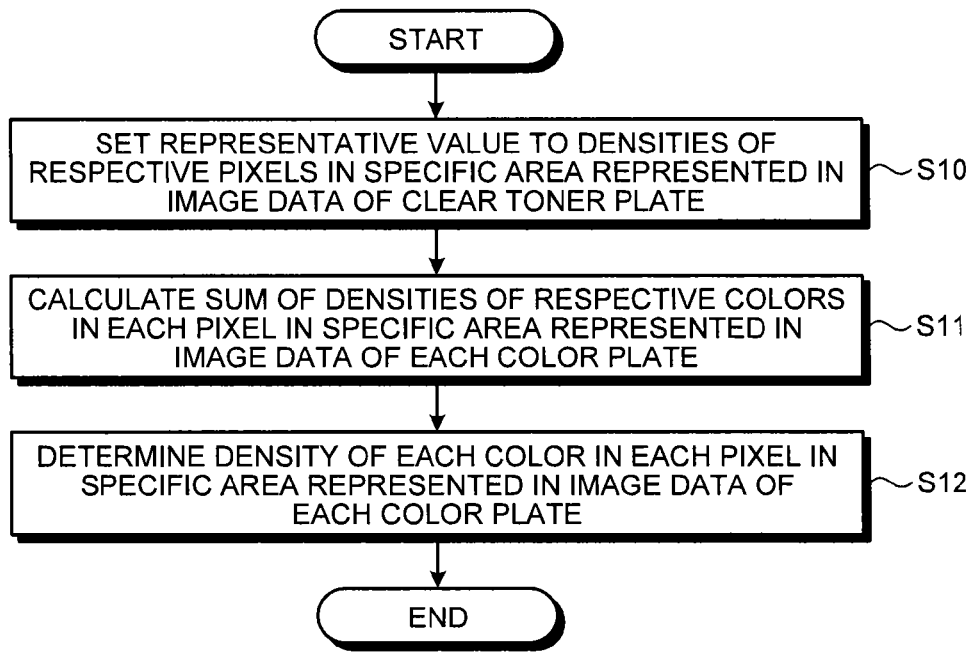
FIG. 13 is a flowchart illustrating an example of a restricting process.

The restricting process according to the second embodiment will now be explained. FIG. 13 is a flowchart illustrating an example of the restricting process performed by the restricting unit 60. It is assumed herein that the restricting unit 60 has already received the image data of the clear toner plate before applied with the restricting process and the representative value RV2 from the second determining unit 74. In the explanation below, it is assumed that the restricting unit 60 is supplied with the image data of the clear toner plate illustrated in FIG. 11 and the representative value RV2 (=V1) corresponding to the input densities represented by a density ratio of 24 percent.

To begin with, the setting unit 62 sets the representative value RV2 to the densities of the respective pixels in the specific area represented in the image data of the clear toner plate (Step S10). In this example, the setting unit 62 sets "V1" to the density of each of the pixels included in the area S represented in the image data of the clear toner plate. The calculating unit 64 then calculates, for each of the pixels in the specific area represented in the image data of each of the color plates (including the clear toner plate), the sum of the densities of the respective colors in the pixel (Step S11).

The determining unit 66 then determines the densities of the respective colors in each of the pixels in the specific area represented in the image data of the respective color plates, using the sum of the densities of the respective colors in the pixel, the representative value RV2, and the reference value (Step S12). More specifically, the determining unit 66 determines, for each of the pixels in the specific area represented in the image data of each of the color plates, the density of each of the colors CMYK so that the sum of the densities of the colors CMYK in the pixel other than the clear toner becomes equal to or lower than a value acquired by subtracting the representative value RV2 from the reference value. When the density of the clear toner in the pixel before set to the representative value RV2 is "zero", the determining unit 66 determines zero as the density of the clear toner in the pixel. When the density of the clear toner in the pixel before set to the representative value RV2 is higher than zero, the determining unit 66 determines the representative value RV2 as the density of the clear toner in the pixel. Explained now in focus is a single pixel included in the area S. In this example, $\alpha 3$ is the density of the color C in the pixel before applied with the restricting process, $\beta 3$ is the density of the color M in the pixel, $\gamma 3$ is the density of the color Y in the pixel, and $\zeta 3$ is the density of the color K in the pixel. Therefore, the total sum calculated at Step S11 is expressed as $\alpha 3+\beta 3+\gamma 3+\zeta 3+V1$.

To begin with, the determining unit 66 determines if the sum of the densities of the respective colors in the pixel calculated at Step S11 exceeds the reference value. If the sum in the pixel is equal to or less than the reference value, the determining unit 66 determines the densities of the colors other than the clear toner immediately before the Step S12 as the densities of the respective colors other than the clear toner. In other words, $\alpha 3$ is determined as the density of the color C. $\beta 3$ is determined as the density of the color M. $\gamma 3$ is determined as the density of the color Y. $\zeta 3$ is determined as the density of the color K. When the density of the clear toner in the pixel before set to "V1" is "zero", the determining unit 66 determines zero as the density of the clear toner in the pixel. When the density of the clear toner in the pixel before set to "V1" is higher than zero, the determining unit 66 determines "V1" as the density of the clear toner in the pixel.

If the sum of the densities of the respective colors in the pixel calculated at Step S11 exceeds the reference value, the determining unit 66 determines the densities of the colors CMYK so that the sum of the densities of the colors CMYK other than that of the clear toner becomes equal to a value acquired by subtracting the representative value RV2 from the reference value. More specifically, the density of the color C in the pixel is determined by Equation (4) below:

$$\alpha 4=\alpha 3\times(\text{Limit}-V1)/(\alpha 3+(\alpha 3+\beta 3+\gamma 3+\zeta 3) \qquad (4)$$

In Equation (4), $\alpha 4$ is the density of the color C determined by the determining unit 66.

The density of the color M in the pixel is determined by Equation (5) below:

$$\beta 4=\beta 3\times(\text{Limit}-V1)/(\alpha 3+(\beta 3+\beta 3+\gamma 3+\zeta 3) \qquad (5)$$

In Equation (5), $\beta 4$ is the density of the color M determined by the determining unit 66.

The density of the color Y in the pixel is determined by Equation (6) below:

$$\gamma 4 = \gamma 3 \times (\text{Limit} - V1)/(\alpha 3 + \beta 3 + \gamma 3 + \zeta 3) \qquad (6)$$

In Equation (6), γ4 is the density of the color Y determined by the determining unit 66.

The density of the color K in the pixel is determined by Equation (7) below:

$$\zeta 4 = \zeta 3 \times (\text{Limit} - V1)/(\alpha 3 + \beta 3 + \gamma 3 + \zeta 3) \qquad (7)$$

In Equation (7), ζ4 is the density of the color K determined by the determining unit 66.

When the density of the clear toner in the pixel before set to "V1" is "zero", the determining unit 66 determines zero as the density of the clear toner in the pixel. When the density of the clear toner in the pixel before set to "V1" is higher than zero, the determining unit 66 determines "V1" as the density of the clear toner in the pixel.

In the manner described above, for each of the pixels included in the area S, the density of each of the colors is determined so that the sum of the densities of the respective colors in the pixels becomes equal to or lower than the reference value, and image data of the respective color plates in which the total amount of toners is restricted is generated. In the second embodiment, the density of each of the colors CMYK is determined so that the sum of the densities of the colors CMYK other than the clear toner (specific color) in each of the pixels included in a specific area represented in the image data becomes equal to or lower than a value acquired by subtracting the representative value RV2 from the reference value. When the density of the clear toner in the pixel before set to the representative value RV2 is zero, the zero is determined as the density of the clear toner in the pixel. By contrast, when the density of the clear toner in the pixel before set to the representative value RV2 is higher than zero, the representative value RV2 is determined as the density of the clear toner in the pixel. Therefore, a haptic effect in a specific color can be realized on a surface of a recording medium advantageously, while suppressing degradation of image quality. In other words, the same advantageous effects as those in the first embodiment can be achieved.

C: Third Embodiment

A third embodiment will now be explained. The third embodiment is different from the second embodiment in that the pattern image stored in the second storage unit 72 can be modified. In the explanation below, parts that are different from the second embodiment will be mainly explained. The parts that are the same as those in the second embodiment are assigned with the same reference numerals, and explanations thereof are omitted as appropriate.

Figure 14:
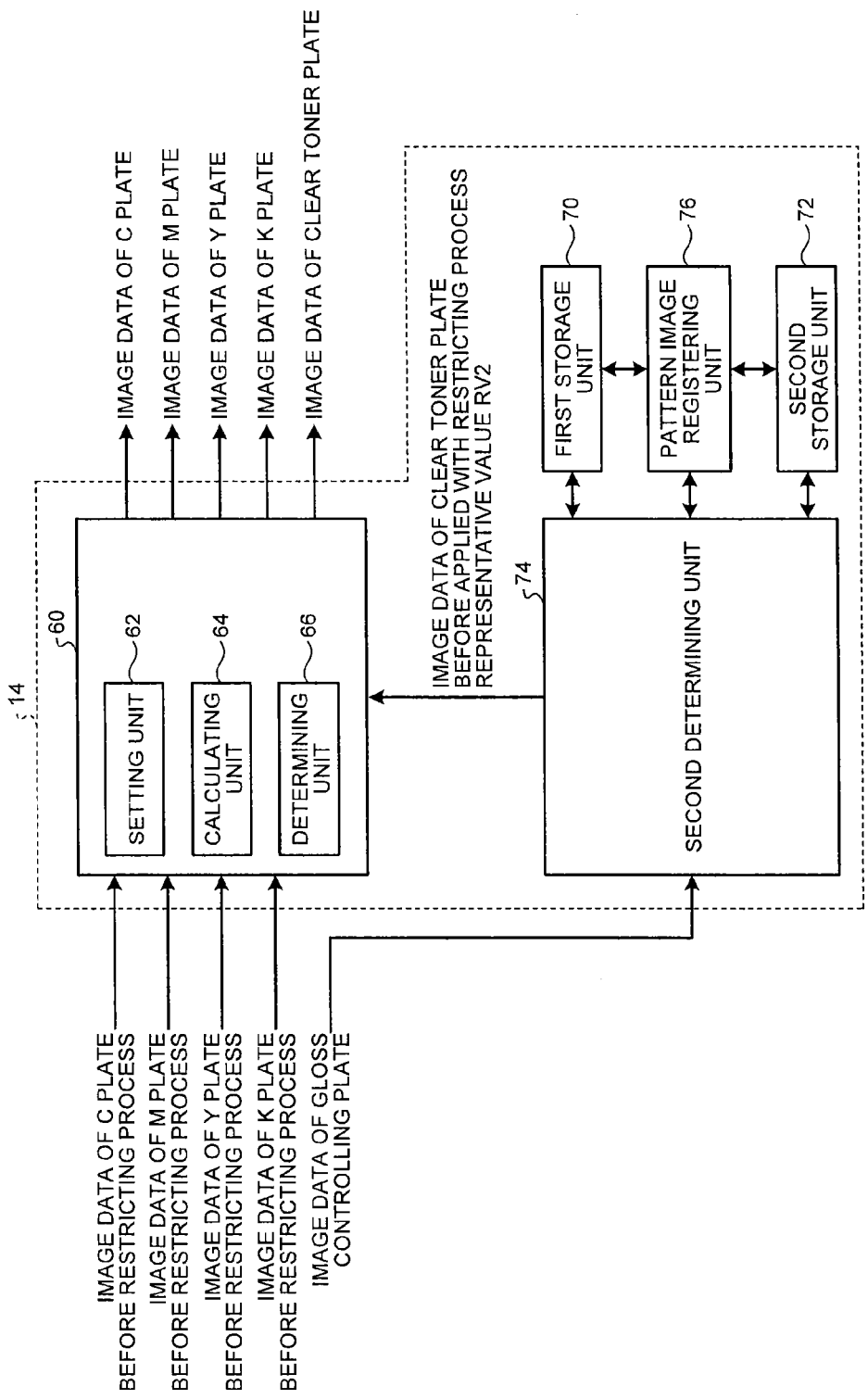
FIG. 14 is a schematic illustrating an example of a functional configuration of a total toner amount restricting unit according to a third embodiment.

FIG. 14 is a block diagram illustrating an example of a detailed functional configuration of the total toner amount restricting unit 14 according to the third embodiment. As illustrated in FIG. 14, the total toner amount restricting unit 14 is different from that in the second embodiment in that a pattern image registering unit 76 is provided in addition to the restricting unit 60, the first storage unit 70, the second storage unit 72, and the second determining unit 74.

When a pattern image created by a user using the application on the PC 40 is received, the pattern image registering unit 76 determines the density ratio of the input densities and a surface effect type corresponding to the pattern image thus received. The pattern image registering unit 76 also determines the representative value RV2 based on the pixel value of each of the pixels included in the pattern image thus received. The pattern image registering unit 76 then registers each piece of information thus determined to the first storage unit 70, and registers the surface effect type thus determined and the pattern image thus received to the second storage unit 72.

D: Fourth Embodiment

A fourth embodiment will now be explained. The fourth embodiment is different from each of the embodiments described above in that the specific color is determined based on priority information indicating which one of the clear toner and a color (a color other than the clear toner) is prioritized, and the restricting process is performed accordingly to the result of the determination. In the explanation below, parts that are different from each of the embodiments described above will be mainly explained. The parts that are the same as those in each of the embodiments are assigned with the same reference numerals, and explanations thereof are omitted as appropriate.

Figure 15:
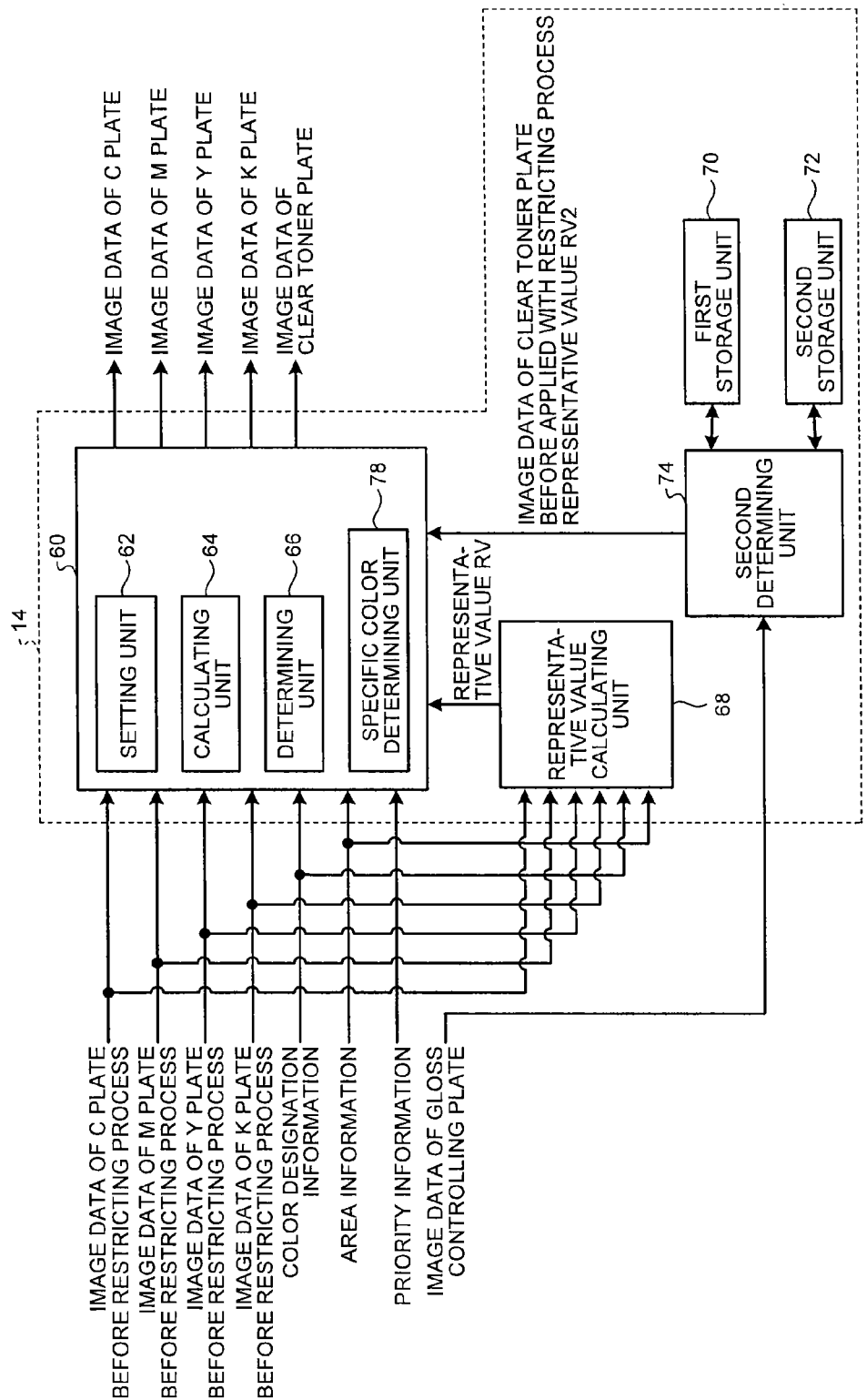
FIG. 15 is a schematic illustrating an example of a functional configuration of a total toner amount restricting unit according to a fourth embodiment.
Figure 16:
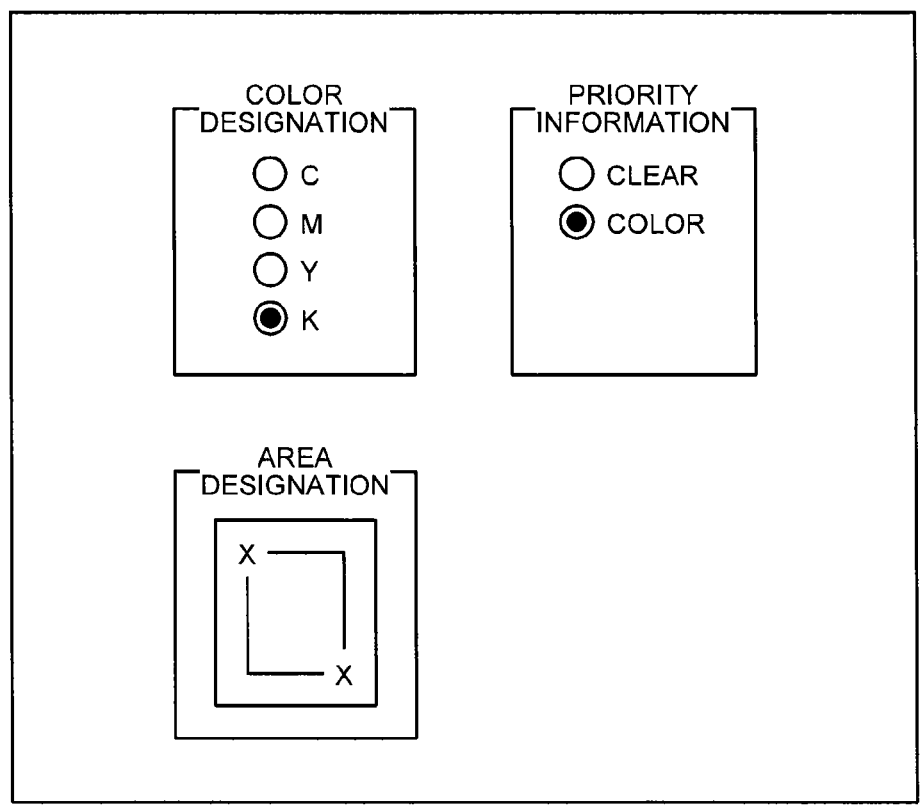
FIG. 16 is a schematic of illustrating an example of an input screen.

FIG. 15 is a block diagram illustrating an example of a detailed functional configuration of the total toner amount restricting unit 14 according to the fourth embodiment. As illustrated in FIG. 15, the total toner amount restricting unit 14 includes the restricting unit 60, the representative value calculating unit 68, the first storage unit 70, the second storage unit 72, and the second determining unit 74. The restricting unit 60 receives priority information indicating which one of the clear toner and the color designated by color designation information is prioritized. In the fourth embodiment, a screen prompting a user to designate one of "clear toner" and "color" is displayed on the UI unit 16, in addition to a screen prompting user to designate the color and the area, as illustrated in FIG. 16. For example, if a user selects a button (e.g., a button displayed on the UI unit 16) for designating the "clear toner", the UI unit 16 outputs priority information indicating that the clear toner is prioritized to the total toner amount restricting unit 14. In such a case, the user does not need to designate a color and an area, in the same manner as in the second embodiment. For example, if a user selects a button (e.g., a button displayed on the UI unit 16) for designating a "color", the UI unit 16 outputs priority information indicating that the color specified in the color information is prioritized to the total toner amount restricting unit 14. In such a case, a user designates the color and the area, in the same manner as in the first embodiment. The UI unit 16 then outputs color designation information indicating the color designated by the user and area information indicating the area designated by the user to the total toner amount restricting unit 14. Such a screen is merely an example, and the priority information, the color designation information, and the area information may be entered in any way. The restricting unit 60 includes a specific color determining unit 78 that determines a specific color based on the priority information thus received, as illustrated in FIG. 15. When priority information indicating that the color specified in the color designation information is prioritized is received, the specific color determining unit 78 determines the color specified in the color designation information as the specific color. When priority information indicating that the clear toner is prioritized is received, the specific color determining unit 78 determines the clear toner as the specific color.

Figure 17:
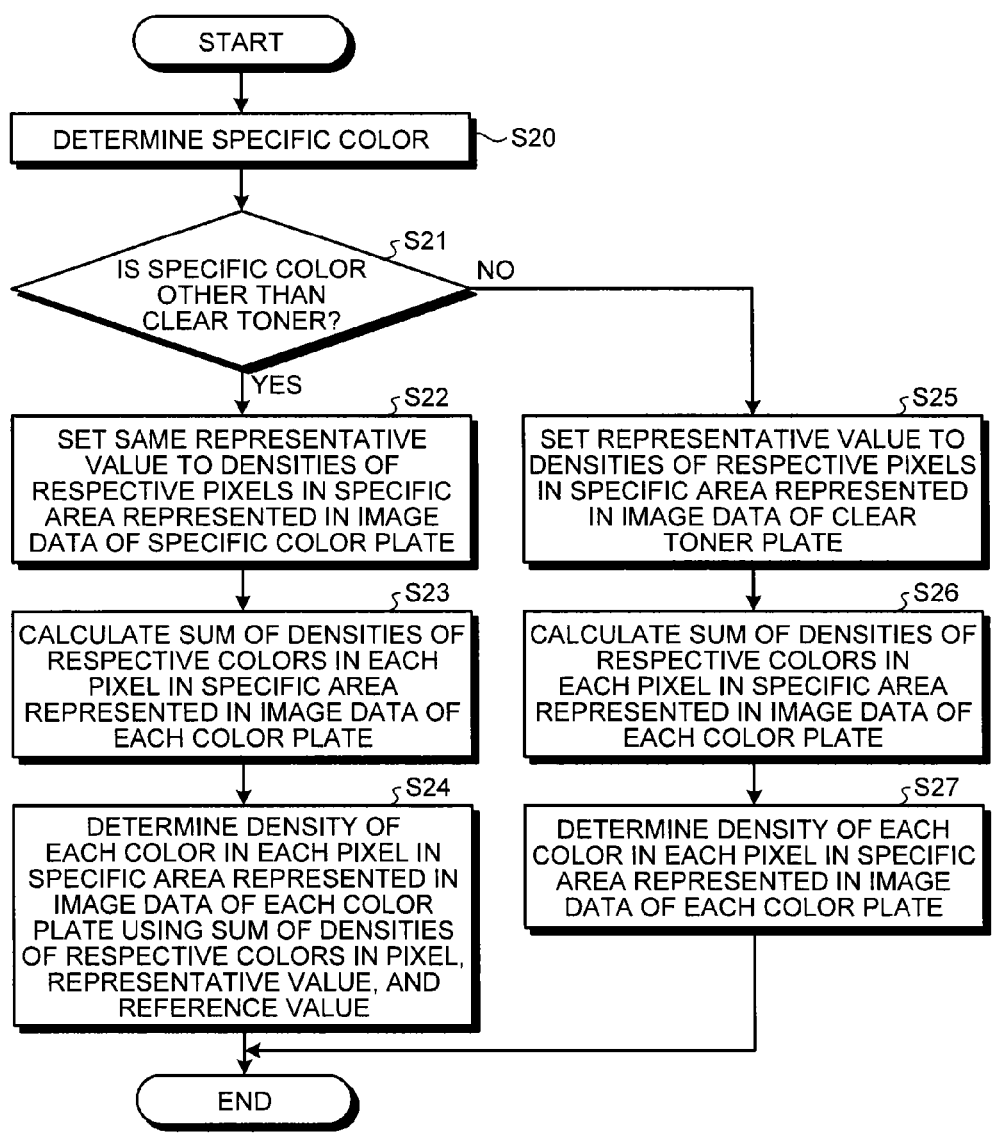
FIG. 17 is a flowchart illustrating an example of a restricting process.

A restricting process according to the forth embodiment will now be explained with reference to FIG. 17. FIG. 17 is a flowchart illustrating an example of the restricting process performed by the restricting unit 60. It is assumed herein that the restricting unit 60 has already received: the image data of the CMYK plates before applied with the restricting process, the color designation information, the area information, the priority information, and the representative value RV from the representative value calculating unit 68, and the image data of the clear toner plate before applied with the restricting process and the representative value RV2 from the second determining unit 74.

As illustrated in FIG. 17, to begin with, the specific color determining unit 78 determines the specific color based on the received priority information (Step S20). If the specific color determining unit 78 determines a color other than the clear toner, that is, the color specified in the color designation information as the specific color (Yes at Step S21), the process goes to Step S22. At Step S22, the setting unit 62 sets the same representative value RV to the density of each of the pixels in the specific area represented in the image data in the specific color plate before applied with the restricting process, regardless of the density of these pixels. This process is the same as Step S1 in FIG. 5. The calculating unit 64 then calculates the sum of the densities of the colors (including the clear toner) in each of the pixels in the specific area represented in the image data of each of the color plates (including the image data of the clear toner plate) (Step S23).

The determining unit 66 then determines density of each of the colors in each of the pixels in the specific area represented in the image data of each of the color plates using the sum of the densities of the respective colors in the pixel, the representative value RV, and the reference value (Step S24). This process will now be explained focusing on one pixel included in the specific area. It is assumed herein that K is specified as the specific color, the representative value RV is "Z1", the density of the color C in the pixel before applied with the restricting process is $\alpha 5$, the density of the color M is $\beta 5$, the density of the color Y is $\gamma 5$, and the density of the clear toner is T. Therefore, the sum of the densities of the respective colors (CMYK+clear toner) in the pixel calculated at Step S3 is expressed as $\alpha 5+\beta 5+\gamma 5+T+Z1$.

To begin with, the determining unit 66 determines if the sum of the densities of the respective colors in the pixel calculated at Step S23 exceeds the reference value. If the sum of the densities of the respective colors in the pixel is equal to or less than the reference value, the determining unit 66 determines the densities before applied with the restricting process as the densities of the colors other than K, respectively. In other words, $\alpha 5$ is determined as the density of the color C, $\beta 5$ is determined as the density of the color M, $\gamma 5$ is determined as the density of the color Y, and T is determined as the density of the clear toner. When the density of the color K in the pixel before set to "Z1" is "zero", the determining unit 66 determines zero as the density of the color K in the pixel. If the density of the color K in the pixel before set to "Z1" is higher than zero, the determining unit 66 determines "Z1" as the density of the color K in the pixel.

If the sum of the densities of the respective colors in the pixel calculated at Step S23 exceeds the reference value, the determining unit 66 determines the density of each of the colors other than K so that the sum of the densities of the colors other than K becomes equal to or lower than a value acquired by subtracting the representative value RV from the reference value. More specifically, the density of the color C in the pixel is determined by Equation (8) below:

$$\alpha 6 = \alpha 5 \times (\text{Limit} - Z1)/(\alpha 5 + \beta 5 + \gamma 5 + T) \qquad (8)$$

In Equation (8), $\alpha 6$ is the density of the color C determined by the determining unit 66, and Limit represents the reference value.

The density of the color M in the pixel is determined by Equation (9) below:

$$\beta 6 = \beta 5 \times (\text{Limit} - Z1)/(\alpha 5 + \beta 5 + \gamma 5 + T) \qquad (9)$$

In Equation (9), $\beta 6$ is the density of the color M determined by the determining unit 66.

The density of the color Y in the pixel is determined by Equation (10) below:

$$\gamma 6 = \gamma 5 \times (\text{Limit} - Z1)/(\alpha 5 + \beta 5 + \gamma 5 + T) \qquad (10)$$

In Equation (10), $\gamma 6$ is the density of the color Y determined by the determining unit 66.

The density of the clear toner in the pixel is determined by Equation (11) below:

$$T2 = T \times (\text{Limit} - Z1)/(\alpha 5 + \beta 5 + \gamma 5 + T) \qquad (11)$$

In Equation (11), T2 represents the density of clear toner determined by the determining unit 66.

When the density of the color K in the pixel before set to "Z1" is "zero", the determining unit 66 determines zero as the density of the color K in the pixel. When the density of the color K in the pixel before set to "Z1" is higher than zero, the determining unit 66 determines "Z1" as the density of the color K in the pixel.

By contrast, if the clear toner is specified as the specific color at Step S20 (No at Step S21), the process goes to Step S25. At Step S25, the setting unit 62 sets the representative value RV2 to the density of each of the pixels in the specific area represented in the image data of the clear toner plate (Step S25). This process is the same as Step S10 in FIG. 13. In this example, it is assumed that the representative value RV2 is set to "Z2". The calculating unit 64 then calculates, for each of the pixels in the specific area represented in the image data of each of the color plates, the sum of the densities of the respective colors in the pixel (Step S26). This process is the same as Step S11 in FIG. 13.

For each of the pixels in the specific area represented in the image data of each of the color plates, the determining unit 66 determines the density of each of the colors in the pixel using the sum of the densities of the respective colors in the pixel, and the representative value RV2, and the reference value (Step S27). This process is the same as Step S12 in FIG. 13. Specifically, this process is as described below.

To begin with, the determining unit 66 determines if the sum of the densities of the respective colors in the pixel calculated at Step S26 exceeds the reference value. When the sum of the respective colors in the pixel is equal to or less than the reference value, the determining unit 66 determines the densities before applied with the restricting process as the densities for the colors CMYK other than the clear toner. In this example, it is assumed that the density of the color C before applied with the restricting process is $\alpha 5$, the density of the color M is $\beta 5$, the density of the color Y is $\gamma 5$, and the density of the color K is $\zeta 5$. Therefore, the determining unit 66 determines $\alpha 5$ as the density of the color C, $\beta 5$ as the density of the color M, $\gamma 5$ as the density of the color Y, and $\zeta 5$ as the density of the color K. When the density of the clear toner before set to "Z2" in the pixel is "zero", the determining unit 66 determines zero as the density of the clear toner in the pixel. When the density of the clear toner before set to "Z2" in the pixel is higher than zero, the determining unit 66 determines "Z2" as the density of the clear toner in the pixel.

When the sum of the densities of the respective colors in the pixel calculated at Step S26 exceeds the reference value, the determining unit 66 determines the density of each of CMYK so that the sum of the densities of the respective CMYK other than the clear toner becomes equal to a value acquired by subtracting the representative value RV2 from the reference value. More specifically, the density of the color C in the pixel is determined by Equation (12) below:

$$\alpha 7 = \alpha 5 \times (\text{Limit} - Z2)/(\alpha 5 + \beta 5 + \gamma 5 + \zeta 3) \quad (12)$$

In Equation (12), $\alpha 7$ is the density of the color C determined by the determining unit 66.

The density of the color M in the pixel is determined by Equation (13) below:

$$\beta 7 = 62.5 \times (\text{Limit} - Z2)/(\alpha 5 + \beta 5 + \gamma 5 + \zeta 5) \quad (13)$$

In Equation (13), $\gamma 7$ is the density of the color M determined by the determining unit 66.

The density of the color Y in the pixel is determined by Equation (14) below:

$$\gamma 7 = \gamma 5 \times (\text{Limit} - Z2)/(\alpha 5 + \beta 5 + \gamma 5 + \zeta 5) \quad (14)$$

In Equation (14), $\gamma 7$ is the density of the color Y determined by the determining unit 66.

The density of the color K in the pixel is determined by Equation (15) below:

$$\zeta 7 = \zeta 5 \times (\text{Limit} - Z2)(\alpha 5 + \beta 5 + \gamma 5 + \zeta 5) \quad (15)$$

In Equation (15), $\zeta 7$ is the density of the color K determined by the determining unit 66.

When the density of the clear toner before set to "Z2" in the pixel is "zero", the determining unit 66 determines zero as the density of the clear toner in the pixel. When the density of the clear toner before set to "Z2" in the pixel is higher than zero, the determining unit 66 determines "Z2" as the density of the clear toner in the pixel.

In the manner described above, the restricting unit 60 determines the specific color based on the priority information indicating which one of the clear toner and a color (a color other than the clear toner) is prioritized, and performs the restricting process based on the result of the determination.

Figure 18:
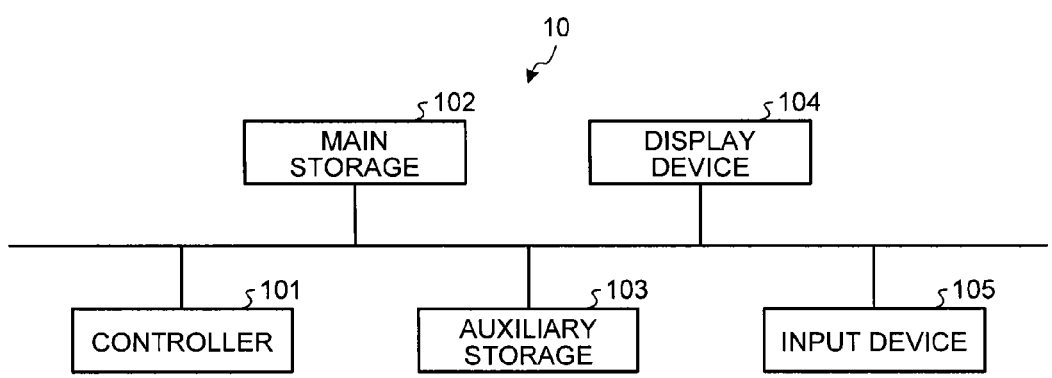
FIG. 18 is a block diagram illustrating an example of a hardware configuration of a digital front end (DFE).

FIG. 18 is a block diagram illustrating an example of a hardware configuration of the DFE 10 according to the embodiments. The DFE 10 according to the embodiments includes a controller 101 such as a CPU, a main storage 102 such as a ROM and a RAM, an auxiliary storage 103 such as a HDD and a compact disk (CD) drive, a display device 104 such as a display device, an input device 105 such as a keyboard and a mouse, and has a hardware configuration utilizing a general computer.

The control program executed by the DFE 10 according to the embodiment is provided in a manner recorded in a computer-readable recording medium such as a compact disk read-only memory (CD-ROM), a flexible disk (FD), a compact disk recordable (CD-R), or a digital versatile disk (DVD), as a file in an installable or an executable format.

The control program executed by the DFE 10 according to the embodiment may be stored in a computer connected to a network such as the Internet and made available for downloads over the network. The control program executed by the DFE 10 according to the embodiment may be provided or distributed over a network such as the Internet. The control computer program executed by the DFE 10 according to the embodiments may be provided in a manner incorporated in a ROM or the like in advance.

The control program executed by the DFE 10 according to the embodiment has a modular structure including each of the units described above (the rendering engine 11, the CMM 12, the TRC 13, the total toner amount restricting unit 14 (including the setting unit 62, the calculating unit 64, the determining unit 66, and the representative value calculating unit 68), the half-tone engine 15, and the UI unit 16). As actual hardware, by causing a CPU (processor) to read the control program from the storage medium and to execute the control program, each of the units described above are loaded onto the main storage; and the rendering engine 11, the CMM 12, the TRC 13, the total toner amount restricting unit 14, the half-tone engine 15, and the UI unit 16 are provided on the main storage. In the embodiments described above, the DFE 10 (the total toner amount restricting unit 14) executes the restricting process according to the embodiments, but the restricting process according to the embodiments may be executed by any controller without limitation to the DFE 10, and may be executed by the PC 40 or a server, for example.

Some of the embodiments are explained above. However, the present invention is not limited to the embodiments described above, and various modifications are possible within a scope not deviating from the essence of the present invention. For example, in the embodiments described above, the image forming apparatus 100 forms an image using toners of a plurality of colors of CMYK, but an image may be formed using a toner of a single color.

According to the embodiments, a controller, an image forming apparatus, and a computer program product can achieve a haptic effect while suppressing deterioration in the image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A controller that controls an image forming unit forming an image on a recording medium based on image data in which densities of a plurality of colors are specified for each pixel, the controller comprising:

a setting unit that sets a common representative value to a density of a specific color indicating one of the colors in each of a plurality of pixels included in a specific area indicating a specific area represented in the image data;

a first determining unit that determines a density of each of the colors so that a sum of densities of the respective colors other than the specific color in the pixels included in the specific area becomes equal to or lower than a value acquired by subtracting the representative value from a reference value indicating a total amount restriction target of a total amount of toners, wherein the specific color is colorless, and the image data includes image data of a color plate and image data of a clear toner plate that is colorless;

a second determining unit that determines densities of the pixels, before set to the representative value, included in the specific area in the image data of the clear toner plate based on a gloss controlling value in a gloss controlling plate, the gloss controlling value specifying a gloss controlling value that identifies a type of a surface effect being a visual or haptic effect given to the recording medium, and identifies an area in the recording medium to which the surface effect is applied;

a first storage unit that stores therein an input density representing a density of each pixel included in the gloss controlling plate, and a type of a surface effect for applying a haptic effect to a surface of the recording medium on which the image is formed, in an associated manner; and a second storage unit that stores therein the type of a surface effect, and a type of a pattern image including a plurality of pixels arranged in a matrix and each of which is set with a density, in an associated manner, wherein the second determining unit determines the densities of the pixels, before set to the representative value, included in the specific area in the image data of the clear toner plate by using the pattern image corresponding to the input density.

2. The controller according to claim 1, wherein
the first determining unit
  determines, when the density of the specific color in a pixel before set to the representative value is zero, zero as the density of the specific color in the pixel, and
  determines, when the density of the specific color in the pixel before set to the representative value is higher than zero, the representative value as the density of the specific color in the pixel.

3. The controller according to claim 1, further comprising a representative value calculating unit that calculates the representative value based on densities of the specific color in the pixels before set to the representative value.

4. The controller according to claim 3, wherein the representative value calculating unit calculates the representative value by dividing a sum of densities of the specific color in the respective pixels in the specific area before set to the representative value by a size of the specific area.

5. The controller according to claim 1, wherein the second determining unit determines densities of the respective pixels in the specific area represented in the clear toner plate by
  dividing the gloss controlling plate using a virtual block in a size of the pattern image corresponding to the input density, and
  acquiring densities of the respective pixels in the specific area assuming that the pattern image is assigned to each segment thus divided.

6. The controller according to claim 1, wherein the representative value is determined based on densities of respective pixels included in the pattern image corresponding to the input density.

7. The controller according to claim 6, wherein the representative value is a value acquired by dividing a sum of the densities of the respective pixels included in the pattern image corresponding to the input density by a size of the pattern image.

8. The controller according to claim 1, further comprising a specific color determining unit that determines the specific color based on priority information indicating which one of the clear toner and a color toner is prioritized.

9. An image forming apparatus comprising:
an image forming unit that forms an image on a recording medium based on image data in which densities of a plurality of colors are specified for each pixel; and
a controller that controls the image forming unit, wherein the controller includes
  a setting unit that sets a common representative value to a density of a specific color indicating one of the colors in each of a plurality of pixels included in a specific area indicating a specific area represented in the image data,
  a first determining unit that determines a density of each of the colors so that a sum of densities of the respective colors other than the specific color in the pixels included in the specific area becomes equal to or lower than a value acquired by subtracting the representative value from a reference value indicating a total amount restriction target of a total amount of toners, wherein the specific color is colorless, and the image data includes image data of a color plate and image data of a clear toner plate that is colorless,
  a second determining unit that determines densities of the pixels, before set to the representative value, included in the specific area in the image data of the clear toner plate based on a gloss controlling value in a gloss controlling plate, the gloss controlling value specifying a gloss controlling value that
    identifies a type of a surface effect being a visual or haptic effect given to the recording medium, and
    identifies an area in the recording medium to which the surface effect is applied,
  a first storage unit that stores therein
    an input density representing a density of each pixel included in the gloss controlling plate, and
    a type of a surface effect for applying a haptic effect to a surface of the recording medium on which the image is formed, in an associated manner, and
  a second storage unit that stores therein
    the type of a surface effect, and
    a type of a pattern image including a plurality of pixels arranged in a matrix and each of which is set with a density, in an associated manner, wherein
  the second determining unit determines the densities of the pixels, before set to the representative value, included in the specific area in the image data of the clear toner plate by using the pattern image corresponding to the input density.

10. A computer program product comprising program codes, when executed, that causes a computer included in a controller that controls an image forming unit forming an image on a recording medium based on image data in which densities of a plurality of colors are specified for each pixel to execute:
  setting a common representative value to a density of a specific color indicating one of the colors in each of a plurality of pixels included in a specific area indicating a specific area represented in the image data;
  determining a density of each of the colors so that a sum of densities of the respective colors other than the specific color in the pixels included in the specific area becomes equal to or lower than a value acquired by subtracting the representative value from a reference value indicating a total amount restriction target of a total amount of toners, wherein the specific color is colorless, and the image data includes image data of a color plate and image data of a clear toner plate that is colorless;
  determining densities of the pixels, before set to the representative value, included in the specific area in the image data of the clear toner plate based on a gloss controlling value in a gloss controlling plate, the gloss controlling value specifying a gloss controlling value that
    identifies a type of a surface effect being a visual or haptic effect given to the recording medium, and
    identifies an area in the recording medium to which the surface effect is applied;
  storing, in a first storage device,
    an input density representing a density of each pixel included in the gloss controlling plate, and
    a type of a surface effect for applying a haptic effect to a surface of the recording medium on which the image is formed, in an associated manner; and
  storing, in a second storage device the type of a surface effect, and a type of a pattern image including a plurality of pixels arranged in a matrix and each of which is set with a density, in an associated manner, wherein the determining determines the densities of the pixels, before set to the representative value, included in the specific area in the image data of the clear toner plate by using the pattern image corresponding to the input density.

\* \* \* \* \*